United States Patent
Mokuya et al.

(10) Patent No.: US 7,257,626 B2
(45) Date of Patent: Aug. 14, 2007

(54) NETWORK DEVICE MANAGEMENT METHOD, NETWORK DEVICE MANAGEMENT SYSTEM, AND PROCESS PROGRAM FOR MANAGING NETWORK DEVICE

(75) Inventors: Senichi Mokuya, Suwa (JP); Shinji Ehara, Beppu (JP); Hozumi Mori, Beppu (JP)

(73) Assignee: Seiko Epson Corporation, Tokyo (JP)

( * ) Notice: Subject to any disclaimer, the term of this patent is extended or adjusted under 35 U.S.C. 154(b) by 893 days.

(21) Appl. No.: 10/195,460

(22) Filed: Jul. 16, 2002

(65) Prior Publication Data
US 2003/0046381 A1 Mar. 6, 2003

(30) Foreign Application Priority Data
Jul. 19, 2001 (JP) ............................. 2001-220587

(51) Int. Cl.
G06F 15/173 (2006.01)
G06F 15/16 (2006.01)
G06F 7/00 (2006.01)

(52) U.S. Cl. ..................... 709/223; 709/246; 707/1; 707/100

(58) Field of Classification Search ................ 709/246, 709/223
See application file for complete search history.

(56) References Cited

U.S. PATENT DOCUMENTS

| | | | | |
|---|---|---|---|---|
| 6,008,805 A | * | 12/1999 | Land et al. | 715/744 |
| 6,502,101 B1 | * | 12/2002 | Verprauskus et al. | 707/101 |
| 6,581,062 B1 | * | 6/2003 | Draper et al. | 707/100 |
| 6,604,100 B1 | * | 8/2003 | Fernandez et al. | 707/3 |
| 6,643,633 B2 | * | 11/2003 | Chau et al. | 707/1 |
| 6,665,731 B1 | * | 12/2003 | Kumar et al. | 709/246 |
| 7,072,903 B2 | * | 7/2006 | Milleker et al. | 707/102 |
| 7,158,990 B1 | * | 1/2007 | Guo et al. | 707/102 |
| 2002/0100027 A1 | * | 7/2002 | Binding et al. | 717/137 |
| 2002/0133581 A1 | * | 9/2002 | Schwartz et al. | 709/223 |
| 2003/0009543 A1 | * | 1/2003 | Gupta | 709/223 |

FOREIGN PATENT DOCUMENTS

| | | |
|---|---|---|
| JP | A 7-152634 | 6/1995 |
| JP | A 11-327936 | 11/1999 |

OTHER PUBLICATIONS

Mapping between ASN.1 and XML; Takeshi Imamura and Hiroshi Maruyama; IBM Research, Tokyo Research Laboratory; Japan; 2000; pp. 1-22.*

Sugiyama Keizo et al., "Realization Of Web-based Management System Based On TMN", 58th National Convention, *Collected Papers of Disclosure*, Database and Media Network, Information Processing Society of Japan, pp. 3-577 and 3-578 (1999). (With English translation).

* cited by examiner

*Primary Examiner*—Zarni Maung
*Assistant Examiner*—Kamal Divecha
(74) *Attorney, Agent, or Firm*—Oliff & Berridge PLC

(57) ABSTRACT

Since an MIB file present in a network device and having the structure of MIB data is expressed in the ASN1 format, the MIB file is not flexibly modified by a user.

A management-information database-structure definition file converter unit 22 converts MIB files 21a, 21b . . . having the MIB data structures of MIB databases 12a, 12b, . . . mounted on the network devices 10a, 10b, . . . into files in a tag-structured format. Specifically, the management-information database-structure definition file converter unit 22 converts MIB files 21a, 21b, . . . into MIB files 23a, 23b . . . in a tag-structured format (XML format). Using the MIB files 23a, 23b, . . . in the XML format, a network device management tool 24 manages the MIB databases 12a, 12b . . . of the respective network devices 10, 10b . . .

9 Claims, 6 Drawing Sheets

FIG. 4.

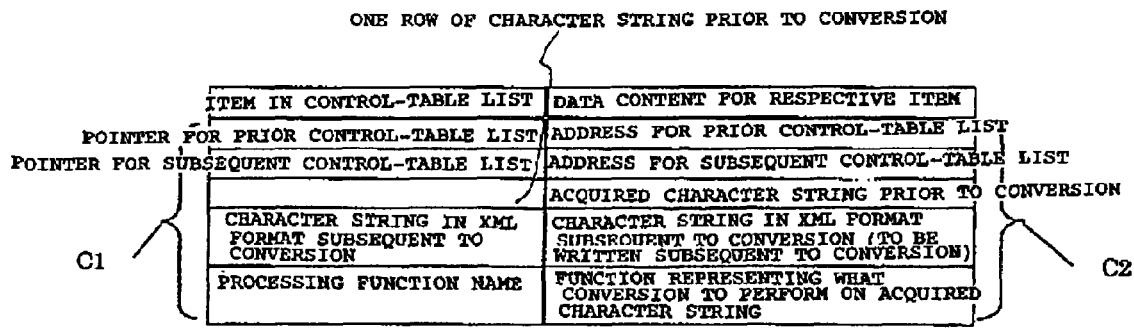

FIG. 5

PART OF XML FILE PRIOR TO CONVERSION

```
epNDModelName OBJECT-TYPE
        SYNTAX   DisplayString (SIZE (0..255))
        ACCESS   read-only
        STATUS   mandatory
        DESCRIPTION
                "Assigned Model Name of the Network Display Device"
        : : = { epNDGeneral 1 }
```

(a)

PART OF XML FILE SUBSEQUENT TO CONVERSION

```
<mibdata>
<objectname>epNDModelName</objectname>
<objectid>1.3.6.1.4.1.1248.2.1.1.1.1</objectid>
<datatype>DisplayString</datatype>
<datasize>0..255</datasize>
<access>read-only</access>
<status>mandatory</status>
<parent>1.3.6.1.4.1.1248.2.1.1.1</parent>
<description>&qout;Assigned Model Name of the Network Display Device&qout;</description>
</mibdata>
```

| | Tag name | Meaning | Remarks |
|---|---|---|---|
| Whole file | mibfile | Start and end of file | Required |
| Device name | devicename | Device name | |
| Import | import | Import of file | Not always present |
| | objectname | Object name defined in file | |
| | file | File to be imported | |
| Export | export | Export of file | Not always present |
| Data type definition | convention | Definition of data type | Not always present |
| | define | Type already defined | Subtag of convention |
| | newtype | Type newly defined | Subtag of convention |
| MIB data | mibdata | Node of MIB | Plurality of pieces of data acceptable |
| | objectid | Object ID | Required |
| | access | Access to MIB | *1 |
| | datatype | Type of data | *1 |
| | datasize | Data size | Meaning different depending on the value of datatype *1, *2 |
| | status | Status | *1 |
| | index | Index | *1 |
| | description | Meaning of MIB | *1 |
| Trap data | mibtrap | Setting of trap | Plurality of pieces of data acceptable |
| | trapenterprise | ID of enterprise | Required |
| | variables | Node name of trap conditions *1 | |
| | reference | Reference | *1 |
| | trapid | Conversion trap ID | Required |
| Table of MIB | tablemib | Table of MIB | Plurality of tables acceptable |
| Sequence | sequence | Sequence | Plurality of sequences acceptable |
| Tag for link | parent | Object name for parent node | *3 |
| | child | Object name for child node | Plurality of children acceptable *3 |

NETWORK DEVICE MANAGEMENT METHOD, NETWORK DEVICE MANAGEMENT SYSTEM, AND PROCESS PROGRAM FOR MANAGING NETWORK DEVICE

TECHNICAL FIELD

The present invention relates to a network device management method, a network device management system, and a process program, each for managing the network device.

BACKGROUND ART

There are systems which totally manage a number of devices (which are referred to as network devices here, and include personal computers, printers, and the like) connected to a network.

If the network device to be managed is a personal computer (abbreviated as PC), data to be managed may include a diversity of data relating to the PC such as data the PC acquired from the network. If the network device to be managed is a printer, the data to be managed is data relating to the printer such as the amount of ink remaining in the printer. Each network device includes a management-information database that stores data to be managed.

The side managing the network device (hereinafter referred to as a management device) accesses the management-information database (an MIB database) on the network device side using network device management software or an MIB (Management Information Base) browser which is one of tools of the software. The management device thus monitors data (MIB data) to be managed and sets data.

A user who manages the network device using the network device management system acquires a management-information database structure definition file (MIB file) described in a standard format called ASN1 from each device manufacturer to know the structure of the management-information database (MIB database), and converts the file into a format unique to the network device management system to use the file.

The MIB database has a tree structure as shown in FIG. 7. The end of the tree stores data unique to the network device, and the location is designated using an address called an object ID. The above-mentioned MIB file expresses the structure of the MIB database.

The specifications of a network device may be modified, resulting in a change in the structure of the MIB data. The device manufacturer managing the MIB data produces a new MIB file, and supplies a user with the new MIB file. Upon obtaining the new MIB file, the user converts it into a format unique to the network device management system to use the MIB file.

In the conventional network device management system, the MIB file described in the ASN1 format is converted into each manufacturer's own format. No compatibility is allowed between the files of different manufacturers. For this reason, a software program, called MIB browser, dedicated for each manufacturer is required to view the MIB database of the network device.

Each time the specifications of the network device is modified, or the MIB data is updated, the user needs to obtain the latest version of the MIB file, and to convert the obtained MIB file into a format unique to the network device management system.

When the latest MIB file is not available, the user needs to edit the MIB file to make an MIB file responsive to the modification.

When the MIB file is edited, a pre-conversion MIB file (the MIB file prior to the conversion into a format unique to the network device management system) or a post-conversion MIB file (the MIB file subsequent to the conversion into the format unique to the network device management system) may be used for editing. The pre-conversion MIB file complies with the ASN1 which is the world's standard. However, the ASN1 format is too complex to briefly edit. The post-conversion MIB file is a file having a manufacturer's own format into which the ASN1 formatted MIB file is converted, and the structure of the converted file is not known and cannot be edited easily, either.

It is an object of the present invention to permit the MIB file to be flexibly modified through the conversion of a management-information database structure definition file (an MIB file) into data in an ordinary format, and to permit a widely available software program to work as a network device management software program using the MIB file.

DISCLOSURE OF THE INVENTION

To achieve the above object, the present invention relates to a network device management method in a network device management system including a network device having a management-information database and a management device having network-device management means for managing the network device, wherein the management device holds a plurality of management-information database structure definition files describing the structure of the management-information database, and the network-device management means manages the management-information database of the network device using the management-information database structure definition files, and wherein the management device converts the management-information database structure definition file into a tag-structured file, and the network device management means manages the management-information database of the network device using the tag-structured management-information database structure definition file.

In the network device management method, the network device management means expresses the management-information database of the network device in a tree structure using the tag-structured management-information database structure definition file, and learns the structure of the management-information database based on the tree structure, thereby managing a predetermined section in the management-information database.

In the network device management method, the process of converting the management-information database structure definition file into the tag-structured file, includes a subprocess including a step of reading the management-information database structure definition file to be converted, and a step of acquiring a character string to be converted from the management-information database structure definition file on a per unit of conversion basis, a subprocess including a step of producing a control-table list to acquire position data representing a position, the character string of the unit of conversion, a process function representing what conversion process to perform on the character string of the unit of conversion, and a character string converted from the character string of the unit of conversion, as data required to convert the acquired character string of one unit of conversion into tag-structured data, a step of acquiring, out of these pieces of data, the position data representing the position, the character string of the unit of conversion, and the process function representing what conversion process to perform on the character string of the unit of conversion, and a step of writing, onto the control-table list, the position data representing the position, the character string of the unit of conversion, and the process function representing what conversion process to perform on the character string of the unit of conversion, a subprocess including a step of converting the character string of the unit of conversion into the tag-structured data in accordance with the process function in the control-table list, a subprocess including a step of writing the tag-structured character string obtained as a result of conversion in the control-table list as a post-conversion character string, and a subprocess including a step of reading the post-conversion character string on a per unit of conversion basis from the control-table list in response to all character strings of the unit of conversion, and a step of writing the read character string in a post-conversion management-information database structure definition file.

In the network device management method, the tag-structured format is an XML format.

A network device management system of the present invention includes a network device having a management-information database and a management device having network-device management means for managing the network device, wherein the management device holds a plurality of management-information database structure definition files describing the structure of the management-information database, and the network-device management means manages the management-information database of the network device using the management-information database structure definition files, and wherein the management device includes a management-information database-structure definition file converter for converting the management-information database structure definition file into a tag-structured file, the management information database-structure definition file converter converts the management-information database structure definition file into the tag-structured file, and the network device management tool manages data in the management-information database of the network device using the tag-structured management-information database structure definition file.

In the network device management system, the network device management means includes a management database processor which expresses the management-information database of the network device in a tree structure using the tag-structured management-information database structure definition file, and a network device management processor which learns the structure of the management-information database based on the tree structure, thereby managing a predetermined section in the management-information database.

In the network device management system, the process of converting the management-information database structure definition file into the tag-structured file, includes a subprocess including a step of reading the management-information database structure definition file to be converted, and a step of acquiring a character string to be converted from the management-information database structure definition file on a per unit of conversion basis, a subprocess including a step of producing a control-table list to acquire position data representing a position, the character string of the unit of conversion, a process function representing what conversion process to perform on the character string of the unit of conversion, and a character string converted from the character string of the unit of conversion, as data required to convert the acquired character string of one unit of conversion into tag-structured data, a step of acquiring, out of these pieces of data, the position data representing the position, the character string of the unit of conversion, and the process function representing what conversion process to perform on the character string of the unit of conversion, and a step of writing, onto the control-table list, the position data representing the position, the character string of the unit of conversion, and the process function representing what conversion process to perform on the character string of the unit of conversion, a subprocess including a step of converting the character string of the unit of conversion into the tag-structured data in accordance with the process function in the control-table list, a subprocess including a step of writing the tag-structured character string obtained as a result of conversion in the control-table list as a post-conversion character string, and a subprocess including a step of reading the post-conversion character string on a per unit of conversion basis from the control-table list in response to all character strings of the unit of conversion, and a step of writing the read character string in a post-conversion management-information database structure definition file.

In the network device management system, the tag-structured format is an XML format.

The present invention relates to a process program for managing a network device used in a network device management system including a network device having a management-information database and a management device having network-device management means for managing the network device, wherein the management device holds a plurality of management-information database structure definition files describing the structure of the management-information database, and the network-device management means manages the management-information database of the network device using the management-information database structure definition files, wherein the process program includes a process including a step of reading the management-information database structure definition file and a step of converting the read management-information database structure definition file into a tag-structured file, and a process including a step of managing data in the management-information database of the network device using the tag-structured management-information database structure definition file.

In the process program for managing a network device, the network device management means expresses the management-information database of the network device in a tree structure using the tag-structured management-information database structure definition file, and learns the structure of the management-information database based on the tree structure, thereby managing a predetermined section in the management-information database.

In the process program for managing a network device, the process of converting the management-information database structure definition file into the tag-structured file, includes a subprocess including a step of reading the management-information database structure definition file to be converted, and a step of acquiring a character string to be converted from the management-information database structure definition file on a per unit of conversion, a subprocess including a step of producing a control-table list to acquire position data representing a position, the character string of the unit of conversion, a process function representing what conversion process to perform on the character string of the unit of conversion, and a character string converted from the character string of the unit of conversion, as data required to convert the acquired character string of one unit of conversion into tag-structured data, a step of acquiring, out of these pieces of data, the position data representing the position, the character string of the unit of conversion, and the process function representing what conversion process to perform on the character string of the unit of conversion, and a step of writing, onto the control-table list, the position data representing the position, the character string of the unit of conversion, and the process function representing what conversion process to perform on the character string of the unit of conversion, a subprocess including a step of converting the character string of the unit of conversion into the tag-structured data in accordance with the process function in the control-table list, a subprocess including a step of writing the tag-structured character string obtained as a result of conversion in the control-table list as a post-conversion character string, and a subprocess including a step of reading the post-conversion character string on a per unit of conversion basis from the control-table list in response to all character strings of the unit of conversion, and a step of writing the read character string in a post-conversion management-information database structure definition file.

In the process program for managing a network device, the tag-structured format is an XML format.

In accordance with the present invention, the management-information database structure definition file (MIB file) is converted into a commonly available tag-structured file. The tag-structured MIB file is handled on a widely available network device management tool. With the widely available network device management tool, MIB data stored in the network device management-information database is managed, for example, is monitored or processed.

The management device thus uses a widely available software program installed therein as the network device management tool, and the system is thus widely used.

The tag-structured MIB file can be edited by a commonly available text editor. Even when the management-information database structure definition file is updated, the user flexibly responds to updating.

The tag-structured format may be an XML format. The tag for the XML format is defined by the user himself, and the user easily edits the MIB file when the editing of the MIB file is carried out by the user himself.

BRIEF DESCRIPTION OF THE DRAWINGS

FIG. 4 illustrates a control-table list produced in the course of the process illustrated in FIG. 3.

FIG. 5($a$) illustrates a (part of) pre-conversion MIB file, and FIG. 5($b$) illustrates a (part of) post-conversion MIB file in the XML format.

FIG. 6 illustrates a tag when an MIB file is converted into an XML formatted MIB file.

BEST MODE FOR CARRYING OUT THE INVENTION

The embodiments of the present invention are now discussed below. The content of the discussion of the embodiments is related to a network device management method, a network device management system, and a process program for managing a network device.

Figure 1:
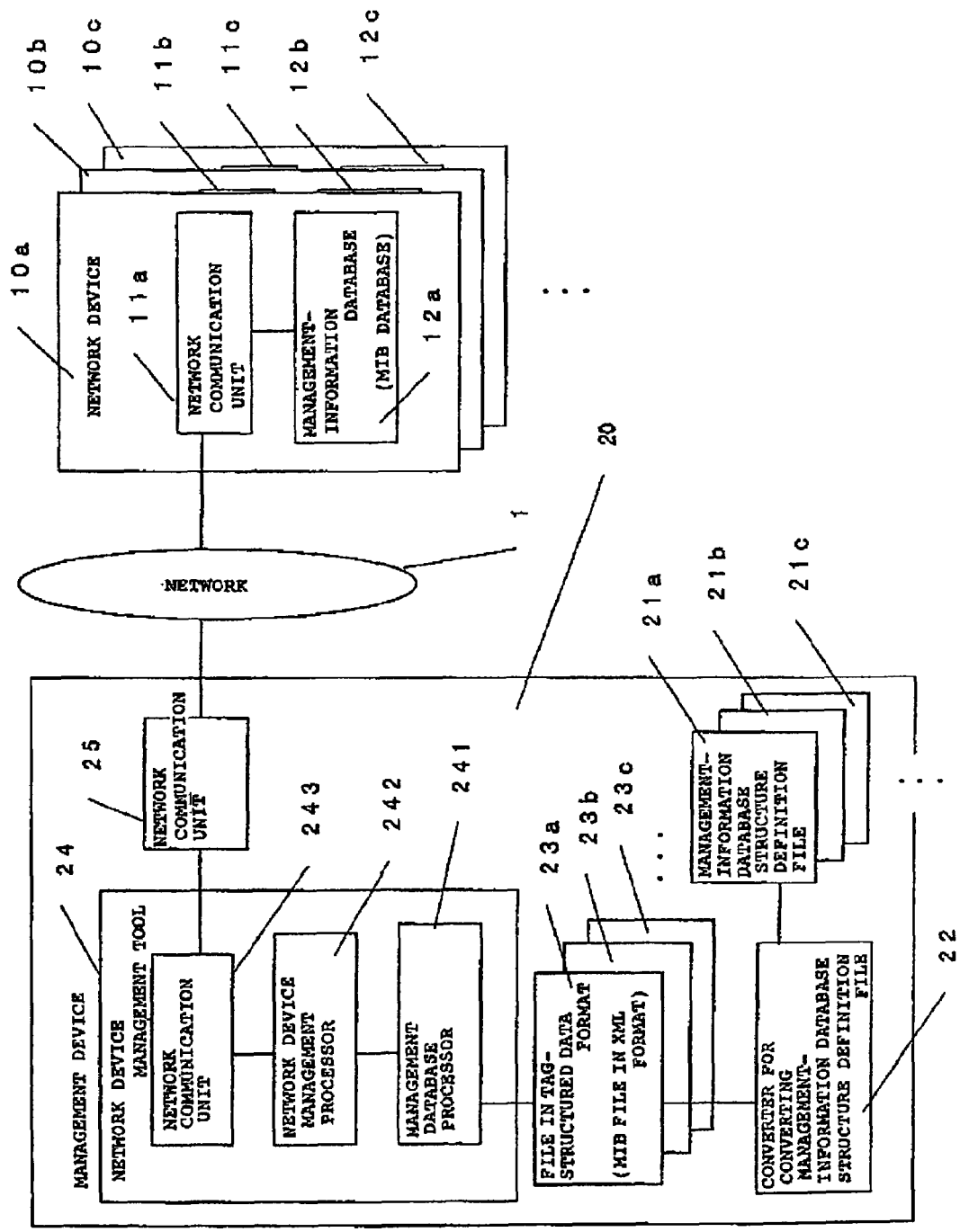
FIG. 1 is a block diagram illustrating a network device management system in accordance with one embodiment of the present invention.

FIG. 1 illustrates the network device management system of the present invention. The network device management system includes, as the major portions thereof, a number of network devices $10a$, $10b$, $10c$, ... connected to a network 1 and a management device (a PC can be used as the management device) 20 for generally managing these network devices $10a$, $10b$, $10c$, ...

Each of the network devices $10a$, $10b$, $10c$, ... includes a device function unit (not shown) performing the originally assigned function as a network device (for example, the function as a PC if the network device is a PC, and the function as a printer if the network device is a printer). Furthermore, the network devices $10a$, $10b$, $10c$, ... respectively include network communication units $11a$, $11b$, $11c$, ... and management-information databases (hereinafter referred to as MIB databases) $12a$, $12b$, $12c$, ... as components related to the present invention.

The network communication units $11a$, $11b$, $11c$, ... physically respectively connect the network devices $10a$, $10b$, $10c$, ... to the network 1, thereby allowing each network device to communicate with another network device or a management device 20.

As already discussed, the network devices $10a$, $10b$, $10c$, ... respectively store a diversity of data (hereinafter referred to as MIB data) of their own in the management-information databases $12a$, $12b$, $12c$, ... and the data structure thereof is a tree structure. Depending on the operation situation of the system, data is typically updated with a portion thereof being deleted or new data added.

The management device 20 includes a management-information database-structure definition file converter unit 22 for converting a plurality of management-information database structure definition files (hereinafter referred to as MIB files) $21a$, $21b$, $21c$, ... describing the data structure of the management-information databases $12a$, $12b$, $12c$, ... into tag-structured files (XML formatted files in this embodiment) $23a$, $23b$, $23c$, ..., a network device management tool 24 as network management means for managing the network devices $10a$, $10b$, $10c$, ..., and a network communication unit 25 which physically connects the management device 20 to the network 1 to communicate with each of the network devices $10a$, $10b$, $10c$, ...

The MIB files $21a$, $21b$, $21c$, ... are files expressing the structures of the MIB databases $11a$, $11b$, $11c$, ... (a description of the ASN1 format), and are supplied by respective device manufacturers. The MIB files $21a$, $21b$, $21c$, ... do not necessarily correspond to the MIB databases $11a$, $11b$, $11c$, ... on a one-to-one correspondence basis.

Specifically, the definitions of the MIB tree structures of the MIB databases $12a$, $12b$, $12c$, ... in the respective network devices $10a$, $10b$, $10c$, ... are typically dispersed across a plurality of MIB files. For example, the definition of the MIB tree structure of the MIB database $12a$ in the network device $10a$ is dispersed across the three MIB files of $21a$, $21b$, and $21c$, and the definition of the MIB tree structure of the MIB database $12b$ in the network device $10b$ is dispersed across the four MIB files of $21d$, $21e$, $21f$, and 21g (these files not shown). In this way, the definition of the MIB tree structure is typically dispersed across a plurality of MIB files.

The network device management tool 24 includes a management database processor 241, a network device management processor 242, and a network communication unit 243.

The management database processor 241 performs a variety of processes, for example, a process for producing a tree structure from the more common management-information database structure definition file (also referred to as an XML formatted MIB file) 23a, 23b, 23c, . . . into which the MIB files are converted by the management-information database-structure definition file converter unit 22.

The network device management processor 242 performs the general process of the network device management tool 24. The network device management processor 242 manages the network device, for example, registers the network device to be managed, and manages the position (address) of the registered network device over the network 1. Furthermore, based on the tree structure produced by the management database processor 241, the network device management processor 242 learns the management-information database structure definition file (the XML formatted MIB file) corresponding to each network device, and produces and outputs the management data (data to acquire the MIB databases 12a, 12b, 12c, . . . and data to perform data updating) for the network device to be managed, in response to the input from the user who operates the management device 20.

Upon receiving a variety of commands and the above-mentioned management data from the network device management processor 242, the network communication unit 243 produces communication information for a network device as a destination, and then sends the communication information to the network communication unit 25.

The process of the present invention thus constructed is discussed below. The MIB files 21a, 21b, 21c, . . . present in the management device 20 illustrated in FIG. 1 are files describing the data structures of the MIB databases 12a, 12b, 12c, . . . (a description in the ASN1 format), and are supplied from respective device manufacturers.

The MIB files 21a, 21b, 21c, . . . in the ASN1 format are converted into the more common tag-structured (XML formatted) files by the management-information database-structure definition file converter unit 22, and are output as the XML formatted MIB files 23a, 23b, 23c, . . .

Figure 2:
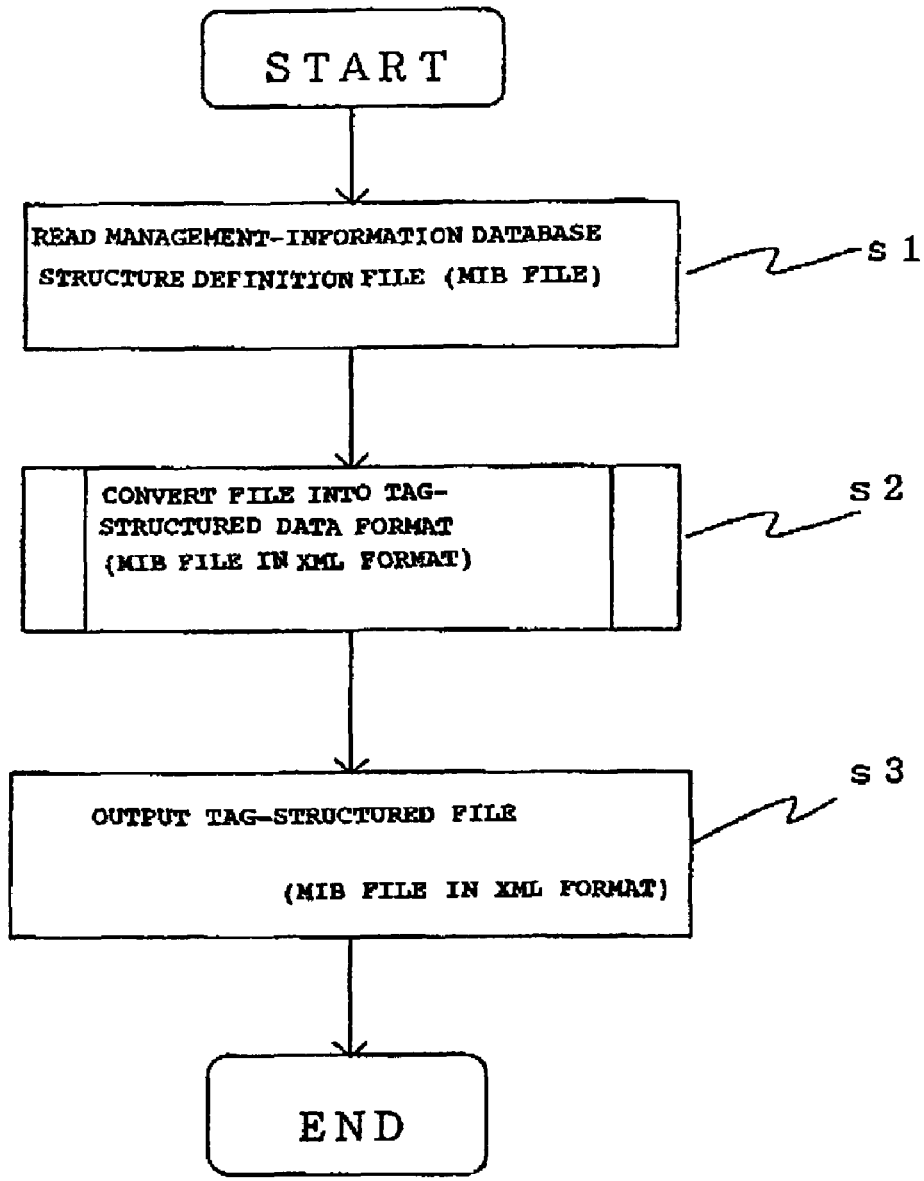
FIG. 2 is a flow diagram diagrammatically illustrating a conversion process which is carried out by a management-information database-definition file converter unit illustrated in FIG. 1.

In the general process carried out by the management-information database-structure definition file converter unit 22 illustrated in FIG. 2, the management-information database structure definition file (MIB file) is read (step S1), the read MIB file is converted into the tag-structured (XML formatted) file (XML formatted MIB file) (step S2), and the XML formatted MIB file is then output (step S3).

Figure 3:
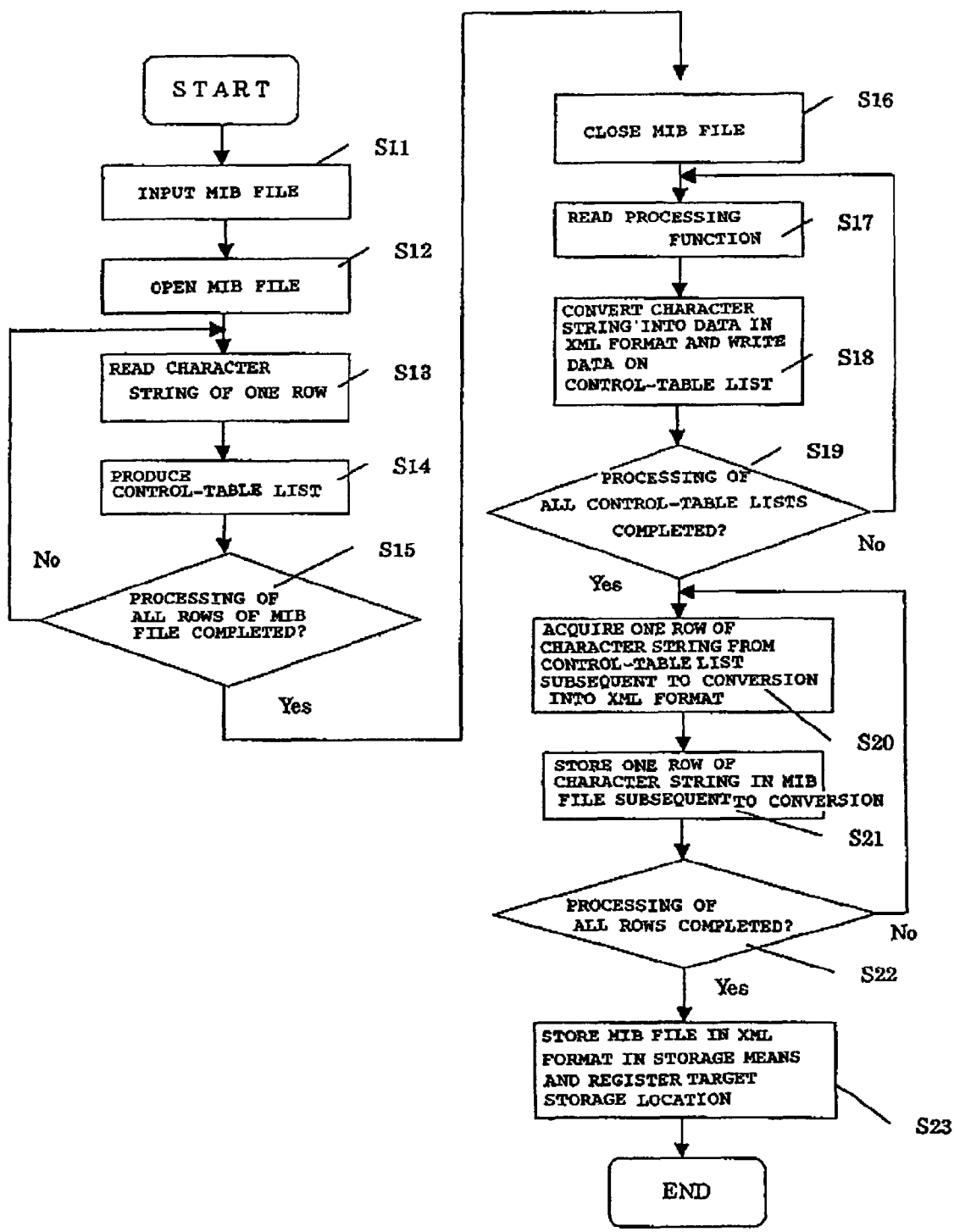
FIG. 3 is a flow diagram illustrating in detail the process through which a management-information database structure definition file (MIB file) illustrated in FIG. 2 is converted into an XML-type MIB file.
Figure 7:
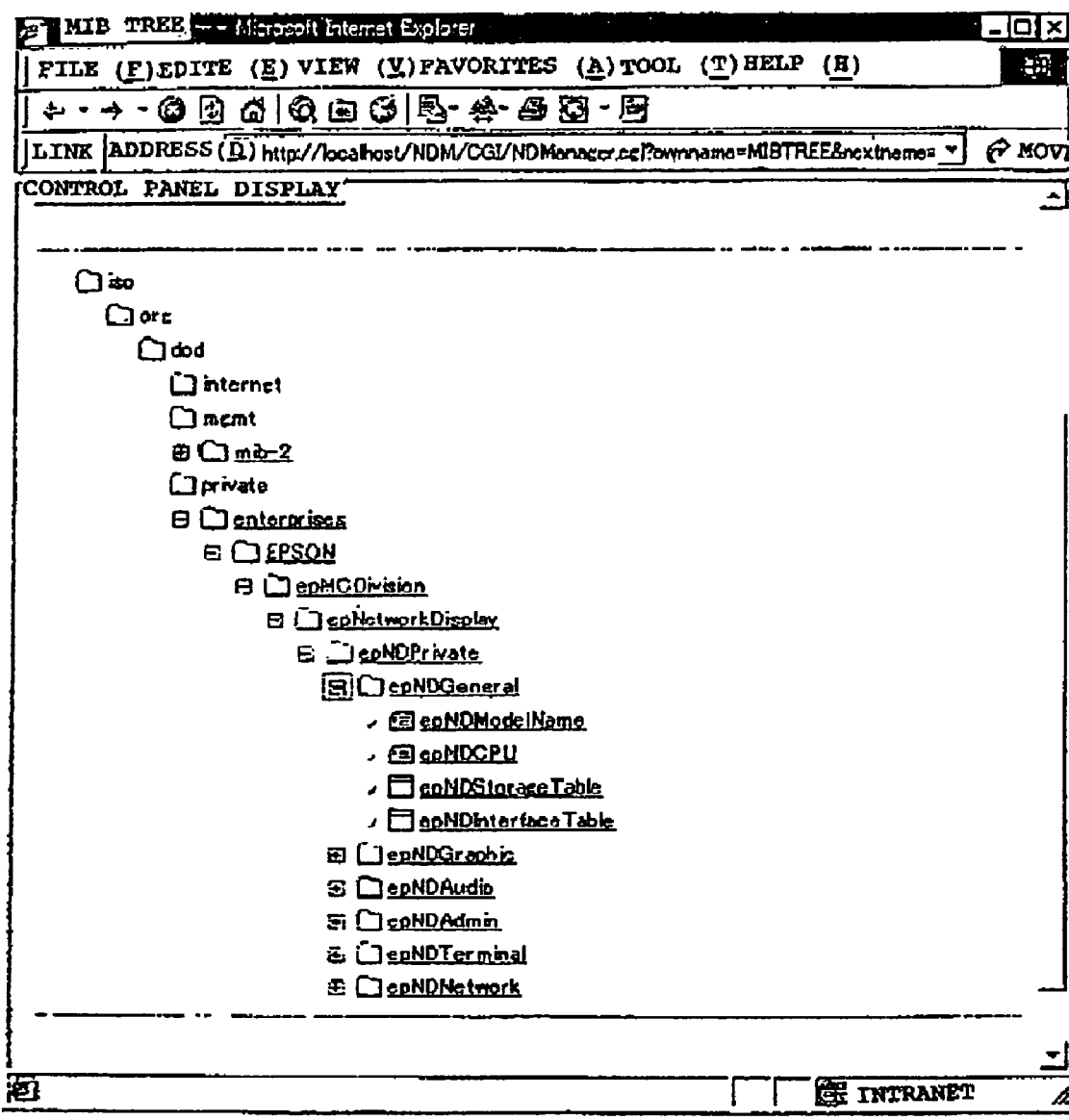
FIG. 7 illustrates a tree structure (of an MIB tree) in the management-information database (MIB database).

FIG. 3 is a flow diagram illustrating more in detail the process in step S2, namely, the process for converting the read MIB file into the tag-structured (XML formatted) file (the XML formatted MIB file).

Referring to FIG. 3, the read MIB file to be processed is received (step S11), that MIB file is opened (step S12), one row of character string as a unit of conversion is read from the MIB file (step S13), and a control-table list is produced (step S14).

The control-table list is produced for each row of character string read, and the content thereof is shown in FIG. 4. The control-table list in FIG. 4 is for one row of character string as a unit of conversion.

The content of the control-table list is composed of an item name description column C1 and a data content description column C2 corresponding to each item as shown in FIG. 4. An item required to perform a conversion process is written on the item name description column C1, and data content corresponding to the item name written on the item name description column C1 is written on the data content description column C2.

The item name written on the item name description column C1 may be a pointer (called pre-pointer) of a control-table list located prior to the current control-table list, a pointer (called post-pointer) of a control-table list located subsequent to the current control-table list, one row of pre-conversion character string read to be converted, an XML formatted character string into which the pre-conversion character string is (XML format) converted, and a process function name.

The data content for the pre-pointer written on the data content description column C2 is an address of the control-table list present prior to the current control-table list, and the data content for the post-pointer is an address of the control-table list present subsequent to the current control-table list. Using these addresses, the position of the control-table list is indicated.

The data content for the one row of pre-conversion character string written on the data content description column C2 is one row of the pre-conversion character string read from the MIB file described in the ASN1 format, and the data content for the post-conversion XML formatted character string is one row of character string converted into the XML format. In step S14, namely, in the course of the control-table list production, the conversion process is not completed. The data content description column C2 for the post-conversion XML formatted character string is thus blank.

The data content for the process function written on the data content description column C2 is a function indicating what process to perform on the one read row of character string. For example, if the character string is a data portion, a tag may be attached thereto, and if the character string is not a data portion, a meaningless comment may be attached thereto. Each read row is sorted, and information as to what process to perform on the row is described on the data content description column C2.

When the control-table list is produced as illustrated in FIG. 4, it is determined whether the reading of all rows of the read MIB file is completed (step S15). When it is determined that all rows are not completed, a next row is read, and a control-table list is then produced. The process is repeated. In this way, the control-table lists are thus produced for all rows of the read MIB file.

When the production of the control-table lists for all rows of the read MIB file is completed, the MIB file is then closed (step S16). The process function described in the control-table list of the row of character string currently processed is read (step S17). In accordance with the process function, the one row of character string is converted into the XML format, and the resulting XML data is written onto a blank column in the control-table list (the data content description column in the post-conversion XML formatted character string) (step S18).

It is then determined whether the process for all control-table lists (the XML conversion process for the one row of the pre-conversion character string described in the control-table list) is completed (step S19). When it is determined the process is not yet completed, the algorithm loops to step S17. The process function is then read from the control-table list. In accordance with the process function, the one row of character string is converted into the XML format, and then the resulting XML character string is written on a blank in the control-table list (on the data content description column for the post-conversion XML character string) (steps S17 and S18).

When the conversion process is completed on all control-table lists, one row of character string described in the XML format is acquired from the control-table list (step S20). The one row of character string is then written on the post-conversion MIB file (step S21). It is then determined whether the process has been completed on all rows (all control-table lists) (step S22). When the process is not yet completed, the algorithm loops to step S20. One row of character string described in the XML format is acquired from the control-table list, and is then written on the post-conversion MIB file. This process (steps S20 and S21) is repeated.

When the process is completed for all character strings, the XML format converted MIB file (the MIB file in the XML format) is stored in storage means (not shown) such as a hard disk mounted in the management device 20, and address information such as a destination of storage is registered in a database (not shown) in the network device management tool 24 (step S23).

Through the above process, the conversion process of a single MIB file is completed for a single MIB file. This process is performed on all MIB files read to be processed. The MIB files 20a, 20b, 20c, . . . described in the ASN1 format are respectively converted into the XML formatted MIB files 23a, 23b, 23c, . . . (see FIG. 1). As described above, the XML formatted MIB files 23a, 23b, 23c, . . . are then stored in the storage means such as the hard disk in the management device 20. In this way, the network device management tool 24 can use the XML formatted MIB files 23a, 23b, 23c, . . .

FIG. 5(a) shows one example of part of the pre-conversion MIB file (described in the ASN1 format). When such an MIB file described in the ASN1 format is converted through the above-referenced process by the management-information database-structure definition file converter unit 22, an XML formatted MIB file shown in FIG. 5(b) results. In the MIB file described in the ASN1 format, objectID (address of an item) cannot be reached without passing through a hierarchically higher item. However, in the XML formatted MIB file, the objectID of the item and the objectID of a higher item are both described in a format that is directly used.

FIG. 6 shows an example of tag for use in the XML formatted MIB file. <mibfile> is used as a tag for the whole file (and means the start and end of the file). <devicename> is used as a tag for a device name, <import> is used as a tag for the import of a file, <objectname> is used as a tag for an object name defined in the file. Depending on content, a tag arbitrarily defined by the user may be used.

As shown in a remark column in FIG. 6, there is data which is necessarily present as data being tagged. Depending on the content of a file, there is data which is not necessarily present. For this reason, there are required tags and non-required tags. For example, tags indicating the start and end of a file are required, and there are cases where tags indicating the import and export of a file, and a tag defining the type of data become unnecessary.

The asterisk (*) marked on the remark column means that there is a special notice such as an exception in the example of tag in FIG. 6. For example, *1 means that there is no tag present for a node having no value. A mark *2 has different meaning, depending on the value thereof. If the datatype has a value representing a character string, the data represents the size of data, and if the datatype has a value representing a numerical value, the data represents a range of data, and if the datatype has a fixed value (plural values are also acceptable), the data represents a fixed value. A mark *3 means that the presence or absence of the tag or the state of the tag (of whether the tag is required) is determined by a linking method.

When a DTD (Document Type Definition) is pasted onto an XML formatted MIX file, the order of tags is determined. In this case, the order is the one listed in FIG. 6.

When the management device 20 is used to manage a network device among the network devices 10a, 10b, 10c, . . . , the function of the management database processor 241 of the network device management tool 24 is used to display the data structure (the MIB tree) of the MIB database from the XML formatted MIB file for the network device to be managed. Observing the MIB tree, the user designates an item to which data operation is desired, such as for data monitoring or data setting, and selects the content of management corresponding to the item (for example, as to whether data is acquired or as to whether the user performs setting on data).

The network device management tool 24 communicates with the network device to be managed, and performs the process based on the item designated by the user and the management content selected by the user (the acquisition of data and setting to the data).

In the above process, the user acquires information of a given management-information database or sets information on the management-information database using the MID tree. When the specifications of the network device are changed followed by a modification in the MID database of the network device, and a modification in the MID file, the user may flexibly respond to the modifications.

In the conventional art, as already discussed, when the MID data structure of the MIB database is changed, the user must obtain an updated MIB file from the device manufacturer, and must perform a conversion operation on the MID file to convert it into a format unique to the network device management system. When the updated MID file is not available, the user must edit the MID file. The editing of the MIB file is not easy, as already discussed.

In accordance with the present invention, as shown in FIG. 1, the MID files 21a, 21b, 21c, . . . are respectively converted into the XML formatted MID files 23a, 23b, 23c, . . . by the management-information database-structure definition file converter unit 22. The XML formatted MID files 23a, 23b, 23c, . . . are edited using a widely available text editor. The user thus flexibly responds to a modification performed in the MID data structure of the MID databases 12a, 12b, 12c, . . .

The XML formatted MID files 23a, 23b, 23c, . . . thus produced are file processed by the network device management tool 24 of the present invention. Furthermore, using a widely available XML file monitoring software program, the MID data structure of the MID database corresponding to the network devices 10a, 10b, 10c, . . . is displayed and learned.

In accordance with the present invention, the user flexibly responds to the modification in the MIB file by converting the management-information database structure definition file (MIB file) into the more common tag-structured file (the XML formatted file). Furthermore, when working with the MIB file, a widely available software program using the MIB file is used as a network device management software program.

The present invention is not limited to the above-referenced embodiments, and a variety of changes is possible without departing from the scope of the present invention. In the above-referenced embodiment, the XML format is used as a tag-structured format. A tag-structured format based on the XML format may be used in the present invention.

In accordance with the present invention, the process program describing the process steps to achieve the purpose of the present invention is produced, and is stored in a storage medium such as a floppy disk, an optical disk, and a hard disk. The storage medium which stores the process program falls within the scope of the present invention. The process program may be downloaded through a network.

In accordance with the present invention, the management-information database structure definition file (MIB file) is converted into the more common tag-structured file. The MIB file in the tag-structured format is handled on a widely available network device management tool. With the widely available network device management tool, MIB data stored in the network device management-information database is managed, for example, is monitored or processed.

The management device thus uses a widely available software program installed therein as the network device management tool, and the system is thus widely used.

The tag-structured MIB file can be edited by a typically available text editor. Even when the management-information database structure definition file is updated, the user flexibly responds to the update.

The tag-structured format may be an XML format. The tag for the XML format is defined by the user himself, and the user easily edits the MIB file when the editing of the MIB file is carried out by the user himself.

The invention claimed is:

1. A network device management method in a network device management system that includes a network device having a management-information database and a management device having a network-device management tool to manage the network device, comprising:
holding, with the management device, a plurality of management-information database structure definition files describing the structure of the management-information database;
managing, with the network-device management tool, the management-information database of the network device using the management-information database structure definition files;
converting, with the management device, the management-information database structure definition file into a tag-structured file; and
managing, with the network device management tool, the management-information database of the network device using the tag-structured management-information database structure definition file, wherein
converting the management-information database structure definition file into the tag-structured file includes:
a subprocess including reading the management-information database structure definition file to be converted, and acquiring a character string to be converted from the management-information database structure definition file on a per unit of conversion basis,
a subprocess including producing a control-table list to acquire position data representing a position, the character string of the unit of conversion, a process function representing what conversion process to perform on the character string of the unit of conversion, and a character string converted from the character string of the unit of conversion, as data required to convert the acquired character string of one unit of conversion into tag-structured data, acquiring, out of these pieces of data, the position data representing the position, the character string of the unit of conversion, and the process function representing what conversion process to perform on the character string of the unit of conversion, and writing, onto the control-table list, the position data representing the position, the character string of the unit of conversion, and the process function representing what conversion process to perform on the character string of the unit of conversion,
a subprocess including converting the character string of the unit of conversion into the tag-structured data in accordance with the process function in the control-table list,
a subprocess including writing the tag-structured character string obtained as a result of conversion in the control-table list as a post-conversion character string,
a subprocess including reading the post-conversion character string on a per unit of conversion basis from the control-table list in response to all character strings of the unit of conversion, and writing the read post-conversion character string in a post-conversion management-information database structure definition file, and
a suborocess including storing the tag-structured file in a storage device in the management device.

2. The network device management method according to claim 1, further including expressing, with the network device management tool, the management-information database of the network device in a tree structure using the tag-structured management-information database structure definition file, and learning the structure of the management-information database based on the tree structure, thereby managing a predetermined section in the management-information database.

3. The network device management method according to claim 1, the tag-structured format being an XML (eXtensible Markup Language) format.

4. A network device management system, comprising:
a network device having a management-information database; and
a management device having a network-device management tool to manage the network device,
the management device holding a plurality of management-information database structure definition files describing a structure of the management-information database, and the network-device management tool managing the management-information database of the network device using the management-information database structure definition files,
the management device including a management-information database-structure definition file converter to convert the management-information database structure definition file into a tag-structured file, and the network device management tool managing data in the management-information database of the network device using the tag-structured management-information database structure definition file, wherein
the management-information database-structure definition file converter converts the management-information database structure definition file into the tag-structured file by;

reading the management-information database structure definition file to be converted, and acquiring a character string to be converted from the management-information database structure definition file on a per unit of conversion basis, producing a control-table list to acquire position data representing a position, the character string of the unit of conversion, a process function representing what conversion process to perform on the character string of the unit of conversion, and a character string converted from the character string of the unit of conversion, as data required to convert the acquired character string of one unit of conversion into tag-structured data, acquiring, out of these pieces of data, the position data representing the position, the character string of the unit of conversion, and the process function representing what conversion process to perform on the character string of the unit of conversion, and writing, onto the control-table list, the position data representing the position, the character string of the unit of conversion, and the process function representing what conversion process to perform on the character string of the unit of conversion, converting the character string of the unit of conversion into the tag-structured data in accordance with the process function in the control-table list, writing the tag-structured character string obtained as a result of conversion in the control-table list as a post-conversion character string, reading the post-conversion character string on a per unit of conversion basis from the control-table list in response to all character strings of the unit of conversion, and writing the read post-conversion character string in a post-conversion management-information database structure definition file, and storing the tag-structured file in a storage device in the management device.

5. The network device management system according to claim 4, the network device management tool including a management database processor which expresses the management-information database of the network device in a tree structure using the tag-structured management-information database structure definition file, and a network device management processor which learns tho structure of the management-information database based on the tree structure, thereby managing a predetermined section in the management-information database.

6. The network device management system according to claim 4, the tag-structured format being an XML format.

7. A process program recorded on a computer-readable storage media for manage a network device in a network device management system that includes a network device having a management-information database and a management device having a network-device management tool to manage the network device, the management device holding a plurality of management-information database structure definition files describing the structure of the management-information database, and the network-device management tool managing the management-information database of the network device using the management-information database structure definition files, the process program comprising instructions to execute the following steps:

reading the management-information database structure definition file;

converting the read management-information database structure definition file into a tag-structured file; and managing data in the management-information database of the network device using the tag-structured management-information database structure definition file, wherein converting the management-information database structure definition file into the tag-structured file includes:

reading the management-information database structure definition file to be converted, and acquiring a character string to be converted from the management-information database structure definition file on a per unit of conversion, producing a control-table list to acquire position data representing a position, the character string of the unit of conversion, a process function representing what conversion process to perform on the character string of the unit of conversion, and a character string converted from the character string of the unit of conversion, as data required to convert the acquired character string of one unit of conversion into tag-structured data, acquiring, out of these pieces of data, the position data representing the position, the character string of the unit of conversion, and the process function representing what conversion process to perform on the character string of the unit of conversion, and writing, onto the control-table list, the position data representing the position, the character string of the unit of conversion, and the process function representing what conversion process to perform on the character string of the unit of conversion, converting the character string of the unit of conversion into the tag-structured data in accordance with the process function in the control-table list, writing the tag-structured character string obtained as a result of conversion in the control-table list as a post-conversion character string, reading the post-conversion character string on a per unit of conversion basis from the control-table list in response to all character strings of the unit of conversion, and writing the read post-conversion character string in a post-conversion management-information database structure definition file, and storing the tag-structured file in a storage device in the management device.

8. The process program recorded on a computer-readable storage media to manage a network device according to claim 7, the network device management tool expressing the management-information database of the network device in a tree structure using the tag-structured management-information database structure definition file, and learning the structure of the management-information database based on the tree structure, thereby managing a predetermined section in the management-information database.

9. The process program recorded on a computer-readable storage media to manage a network device according to claim 7, the tag-structured format being an XML format.

* * * * *